United States Patent [19]
Krumbein

[11] 3,829,039
[45] Aug. 13, 1974

[54] MOTION PICTURE PROJECTOR WITH FILM STRIPPING MECHANISM

[75] Inventor: Fritz Krumbein, Stuttgart-Mohringen, Germany

[73] Assignee: Robert Bosch Photokino GmbH, Stuttgart, Germany

[22] Filed: Aug. 28, 1972

[21] Appl. No.: 284,380

[30] Foreign Application Priority Data
Aug. 17, 1971  Germany............................ 2141083

[52] U.S. Cl.................. 242/192, 242/205, 352/178
[51] Int. Cl......................... G03b 1/04, G11b 15/32
[58] Field of Search........................... 242/201–205, 242/192; 352/166, 168, 173, 178, 179

[56] References Cited
UNITED STATES PATENTS

| | | | |
|---|---|---|---|
| 2,664,251 | 12/1953 | Berlant | 242/202 |
| 3,072,352 | 1/1963 | Loewe | 242/202 |
| 3,085,758 | 4/1963 | Herrmann et al. | 242/201 |
| 3,550,880 | 12/1970 | Palmer | 242/192 |
| 3,750,977 | 8/1973 | Yamanaka et al. | 242/192 |

Primary Examiner—Leonard D. Christian
Attorney, Agent, or Firm—Michael S. Striker

[57] ABSTRACT

A motion picture projector wherein a stripping mechanism threads the leader of motion picture film has a manually operable lever which carries a friction coupling serving to rotate the shaft for the core of the supply reel in a direction to collect the film while the band of the stripping mechanism engages the outermost film convolution. The coupling becomes ineffective when the convolutions of the film are tightly packed around the core of the supply reel. The shaft for the supply reel can be rotated by the motor which drives the coupling when the operation of the motor is reversed whereby the supply reel collects the film by drawing it off the takeup reel.

10 Claims, 3 Drawing Figures

MOTION PICTURE PROJECTOR WITH FILM STRIPPING MECHANISM

BACKGROUND OF THE INVENTION

The present invention relates to cinematographic apparatus in general, and more particularly to improvements in motion picture projectors with film stripping mechanisms. Still more particularly, the invention relates to improvements in motion picture projectors which utilize cassettes or cartridges for convoluted motion picture film.

Film stripping mechanisms are used in motion picture projectors to facilitate automatic threading of the leader of motion picture film from the supply reel in an inserted cartridge, past the film gate and into the range of the customary pull-down or another film transporting device which advances the leader to the core of the takeup reel. A stripping mechanism normally comprises a driver belt which can be moved into engagement with the outermost convolution of film in a cartridge to rotate the supply reel in a direction to pay out the film, and a finger which can engage the outermost convolution so as to intercept and deflect the leader whereby the leader is compelled to enter into and to advance along a predetermined path into the range of the pull-down.

It is further known to provide a motion picture projector which embodies a film stripping mechanism with a device which tightens the convolutions of film in an inserted cartridge by rotating the supply reel in a direction to collect the film. In certain presently known projectors, the manual which is furnished with the projector contains instructions to start the motor in reverse prior to threading of film in order to counteract the tendency of the film to clockspring. Thus, the convolutions of film in a cartridge exhibit the tendency to expand and to fill the interior of the cartridge; this complicates the task of the film stripping mechanism. By starting the motor in reverse, the operator of the projector insures that the supply reel in the cartridge is rotated in a direction to collect the film whereby the convolutions of such film are tightly packed at the time the film stripping mechanism is started. Such operation of the motor in reverse is necessary in all types of motion picture projectors wherein the supply reel in the cartridge is free to rotate in a direction to pay out the film. The starting of motor in reverse is a task which is likely to be forgotten by the user whereby the film stripping mechanism might not be capable of automatically threading the leader through the projector and into the range of the pull-down.

It is further known to provide a motion picture projector which includes a film stripping mechanism with an auxiliary drive which tends to rotate the supply reel in an inserted cartridge in a direction to collect the film. The auxiliary drive operates by friction so that its force can be overcome by the film stripping mechanism which causes the leader of film to advance into the range of the pull-down. A drawback of such projectors is that the pull-down must transport the film against the opposition of the auxiliary drive. This will be readily appreciated since the pull-down must transport the film forwardly while the auxiliary drive tends to rotate the supply reel in the cartridge in a direction to collect the film. Therefore, the action of the auxiliary drive upon the supply reel must be very weak; otherwise, the pull-down is likely to tear the film in the region of perforations. Consequently, the auxiliary drive is incapable of rewinding the film onto the supply reel upon completed projection of the images of film frames. Therefore, such motion picture projectors must be provided with a discrete rewinding mechanism which occupies additional room and contributes to the cost of the apparatus. As a rule, the rewinding mechanism operates by friction which is strong enough to rapidly rewind the film onto the supply reel so that little time is wasted between the presentation of images of frames on successive films. The aforementioned auxiliary drive whose main purpose is to tension the film in the cartridge prior to automatic threading would be capable to effect initial rearward transport of the film but it ceases to operate properly when the diameter of the supply of film on the reel in the cartridge increases. The rewinding mechanism can employ a strong friction clutch or a clutch which positively engages and rotates the supply reel without any slippage.

It was further proposed to use in a motion picture projector a complex, bulky and expensive transmission which can effect a change in the force with which a single drive can rotate the supply reel in a direction to collect the film so that the single drive offers a relatively low resistance to forward transport of the film by the film stripping mechanism and/or by the pull-down during threading of film and the same drive is thereupon capable of rapidly returning the film into the cartridge upon completed presentation of the last image. Such transmissions failed to gain wide-spread acceptance because of their high initial cost and proneness to malfunction.

SUMMARY OF THE INVENTION

An object of the invention is to provide a motion picture projector which embodies a film stripping mechanism with novel and improved drive means which can counteract and eliminate clockspringing of film prior to and during operation of the film stripping mechanism and which is also capable of effecting rapid rewinding of film onto the reel in a cartridge upon completed presentation of the images of film frames.

Another object of the invention is to provide a drive means which is simpler, more compact, less expensive, more rugged and more reliable than heretofore known drive means which are used to eliminate clockspringing and to effect rapid transport of film back into the interior of a cartridge.

A further object of the invention is to provide a drive means which exhibits all advantages but avoids the drawbacks of presently known drive means for rotating the supply reel in a cartridge in a direction to collect the film.

An additional object of the invention is to provide a motion picture projector which embodies the improved drive means.

The invention is embodied in a motion picture projector having a film stripping mechanism which is operable to thread the leader of motion picture film which is stored on a supply reel. The stripping mechanism has a starting means (e.g., a lever) which is actuatable to initiate the operation of the stripping mechanism, for example, by moving a driven belt of the stripping mechanism against the outermost convolution of film on the supply reel. The projector further comprises a rotary supporting member (e.g., a shaft which is provided with a friction wheel) which serves to directly engage and rotate the supply reel, and novel drive means for rotating the supporting member and the supply reel thereon in a direction to collect the film in response to actuation of the starting means. The drive means comprises a friction coupling which preferably includes a driven element in the form of a friction wheel movable into engagement with the friction wheel of the supporting member and serving to transmit to the supporting member torque of a predetermined magnitude. When the magnitude of such torque is exceeded, the friction coupling becomes ineffective and enables the stripping mechanism to rotate the supply reel in a direction to pay out the film whereby the leader of the film is deflected by a customary finger of the stripping mechanism and is advanced toward the takeup reel.

In accordance with another feature of the invention, the supporting member is rotatable with the supply reel in a direction to collect the film when the starting means of the stripping mechanism is idle and the drive means preferably further comprises means which is operable in the idle or non-actuated condition or position of the starting means to rotate the supporting member and the reel thereon in a direction to collect the film, i.e., to withdraw the film from the takeup reel.

The novel features which are considered as characteristic of the invention are set forth in particular in the appended claims.

The improved motion picture projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
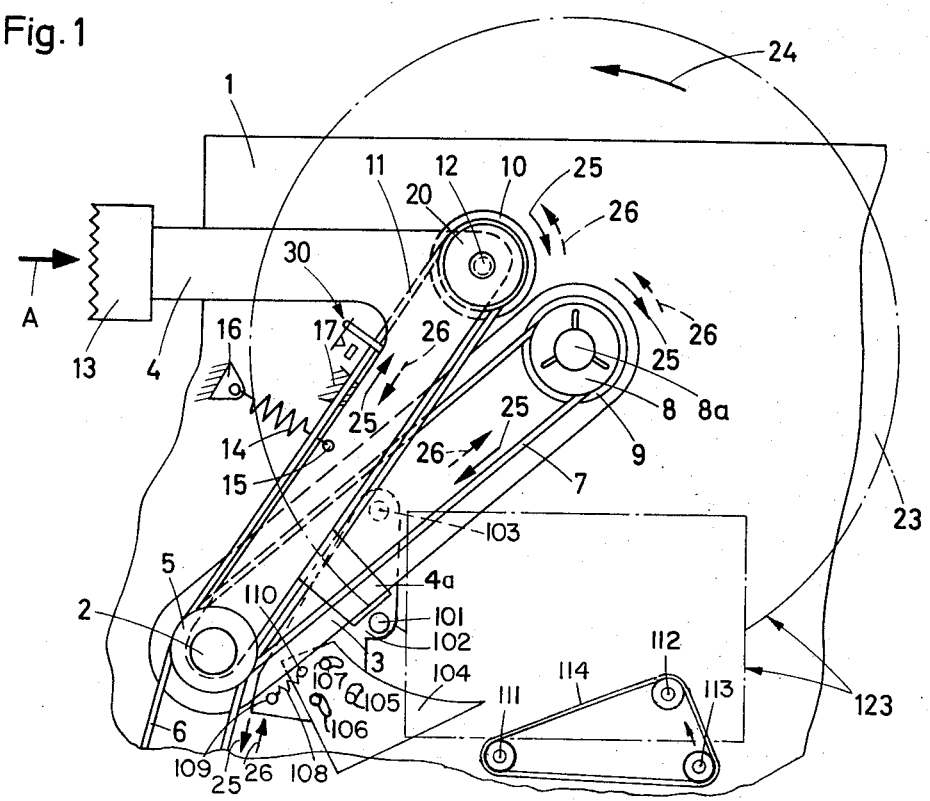
FIG. 1 is a fragmentary elevational view of a motion picture projector which embodies the invention, the drive means being shown in its idle position.
Figure 2:
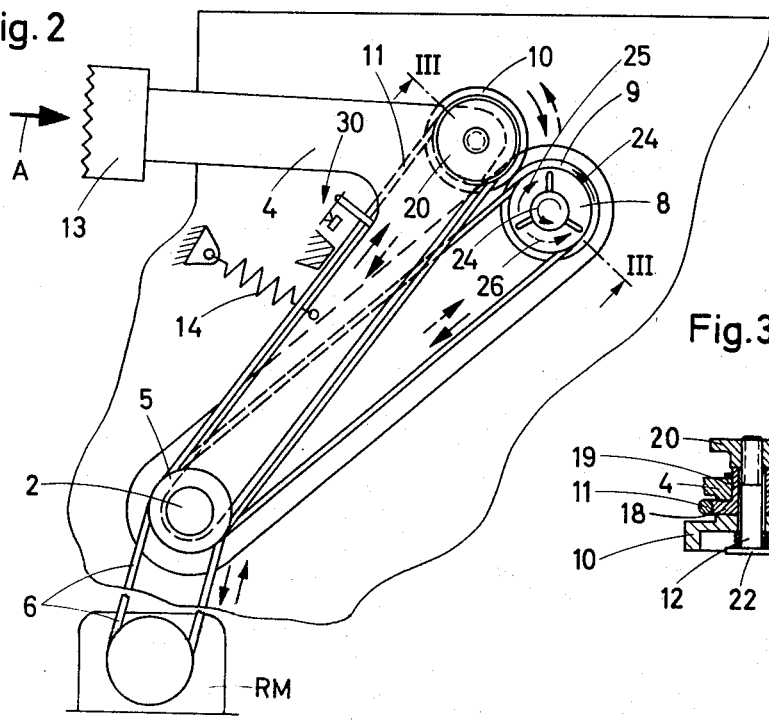
FIG. 2 illustrates a portion of the structure shown in FIG. 1, with the drive means in the operative position.

Referring first to FIG. 1, there is shown a motion picture projector which comprises a housing 1 supporting a horizontal shaft 2 for pulley or sheave 5 with three grooves. The shaft 2 further supports a pivotable carrier arm 3 and a pivotable starting member here shown as a bell crank lever 4. One groove of the pulley 5 receives a portion of an endless belt or cord 6 which can be driven by the output element of a reversible electric motor RM (FIG. 2). Another groove of the pulley 5 receives a portion of a second endless belt or cord 7 which can drive a sleeve 8 forming part of the drive means and rotatably mounted at the free end of the carrier arm 3. To this end, a portion of the sleeve 8 constitutes a simple pulley or sheave (see FIG. 3) having a single circumferential groove for the belt 7. The sleeve 8 is adjacent to a friction wheel 9 which can be engaged and rotated by a second friction wheel 10 rotatably mounted on a pin 12 which is journalled in an intermediate portion of the bell crank lever 4. The friction wheel 10 is adjacent to a pulley or sheave 18 having a single circumferential groove for a portion of a third endless belt or cord 11 driven by the pulley 5 on the shaft 2.

The free end of the bell crank lever 4 is provided with an actuating knob or handgrip portion 13 which can be depressed by the operator's finger in the direction indicated by arrow A. The operator must overcome the opposition of a helical return spring 14 which tends to maintain the bell crank lever 4 in engagement with a fixed stop 17 in the housing 1. One end of the spring 14 is received in a hole 15 of the lever 4, and its other end is anchored in a stationary retainer 16 of the housing 1.

Figure 3:
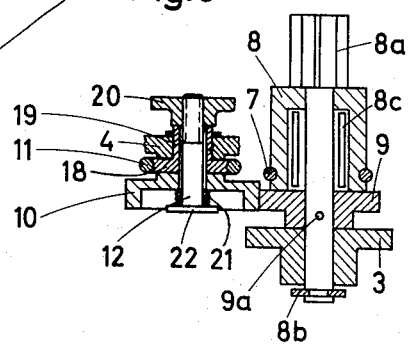
FIG. 3 is a sectional view as seen in the direction of arrows from the line III—III of FIG. 2.

As shown in FIG. 3, the sheave 18 has an elongated sleeve or hub 19 extending in a direction away from the friction wheel 10. The rear end portion of the pin 12 is externally threaded to take a knurled nut 20 which abuts against the adjacent end face of the hub 19. A biasing means here shown as a helical spring 21 reacts against a flange 22 at the forward end of the pin 12 and serves to urge the friction wheel 10 against the adjacent end face of the sheave 18 while simultaneously biasing the hub 19 of the sheave 18 against the nut 20. It will be noted that the pulley 5 can drive the friction wheel 10 only as long as the friction between the sheave 18 and wheel 10 is sufficient to maintain the wheel 10 in rotary motion. The parts 10 and 18 constitute a simple friction coupling. The hub 19 is mounted in the bell crank 4 so that the sheave 18 can be said to support the pin 12. By rotating the nut 20, one can change the bias of the spring 21 and hence the friction between the wheel 10 and the pulley 18 to thereby change the magnitude of torque which the pulley 18 can transmit to the wheel 10.

FIG. 3 further shows that the sleeve 8 surrounds a reel supporting shaft 8a which is rotatable therein in one direction and is secured to the friction wheel 9 by a pin 9a. The friction wheel 9 can be made integral with and can be said to form part of the reel supporting shaft 8a. A split ring 8b cooperates with the friction wheel 9 to hold the shaft 8a against axial movement relative to the carrier arm 3. The split ring 8b is received in a circumferential groove in the rear end portion of the shaft 8a. A one-way clutch 8c is interposed between the sleeve 8 and the shaft 8a; this clutch causes the shaft 8a to rotate with the sleeve 8 in the direction indicated by the arrow 26.

When the belt 7 drives the sleeve 8 in the direction indicated by arrow 25, the one-way clutch 8c is ineffective, i.e., the sleeve 8 rotates relative to the shaft 8a. Also, the clutch 8c allows the sleeve 8 to rotate in the direction of arrow 25 when the shaft 8a is rotated by the friction wheels 10 and 9 in the direction indicated by arrow 24.

Referring again to FIG. 1, the phantom-line circle 23 indicates the rotary supply reel in the casing (not shown) of a customary cassette or cartridge 123 for motion picture film. The film stripping mechanism is identical with that disclosed in U.S. Pat. No. 3,550,880 to Palmer. The bell crank lever 4 corresponds to the lever 3 shown in FIGS. 1–3 of the Palmer patent. The arrow 24 indicates the direction in which the supply reel 23 is to be rotated in order to collect the film. The core of the reel 23 is mounted on and rotates with the winged end portion of the shaft 8a. The stripping mechanism rotates the reel 23 in a clockwise direction during threading of the leader of film through the motion picture projector so that the leader can move into the range of the customary claw pull-down which continues to transport the leader toward the core of the takeup reel.

The film stripping mechanism comprises a lever 102 which is pivotable on a pivot member 103 and has a pin 101 located in the path of movement of a projection 4a on the bell crank lever 4. The lever 102 further carries a finger 104 which is movably secured thereto by three pin-and-slot connections 105, 106 and 107. A spring 108 is attached to a post 109 of the lever 102 and to a post 110 of the finger 104.

An endless belt 114 is trained over rollers 111, 112 and 113. The belt 114 is preferably elastic and has a surface which can engage the outermost convolution of film on the supply reel 23 with sufficient friction to rotate the reel 23 in a direction to pay out the film.

The lever 102 is pivoted by the bell crank lever 4 in response to depression of the knob 13. When the reel 23 is rotated by the belt 114, the leader of convoluted film is deflected by the finger 104 and advances toward the pull-down.

In order to start the motor RM in a forward direction (arrows 25), the operator actuates the starting lever 4 for the stripping mechanism by depressing the knob 13 in the direction indicated by arrow A whereby the lever 4 closes a microswitch 30 in the motor circuit. The friction wheel 10 is pivoted into engagement with the friction wheel 9 whereby the latter rotates in the direction indicated by the arrow 24 and drives the core of the supply reel 23 by way of the pin 9a and shaft 8a. The supply reel 23 rotates in a counterclockwise direction. The power train between the motor RM and the shaft 8a includes the belt 6 (which moves in the direction of arrow 25), the pulley 5, the belt 11, the pulley 18, the friction wheels 10, 9 and the pin 9a. At the same time, the belt 7 drives the sleeve 8 in the direction of arrow 25 because the clutch 8c allows the sleeve 8 to rotate on the shaft 8a (which rotates in the direction of arrow 24). The belt 114 of the film stripping mechanism engages the outermost convolution of film on the supply reel 23 so that the convolutions of film are tightly packed due to rotation of the reel 23 in the direction of arrow 24. When the packing of film convolutions is completed, the pulley 18 begins to slide relative to the friction wheel 10 and the belt 114 of the film stripping mechanism begins to rotate the supply reel 23 in a direction (counter to that indicated by arrow 24) to pay out the film. The leader of film is then engaged and deflected by the finger 104 of the stripping mechanism and is caused to advance into the range of the pull-down. During transport of film to the takeup reel (not shown), the reel 23 rotates in the direction indicated by arrow 25. The belt 7 drives the sleeve 8 in the same direction (arrow 24 in FIG. 2) whereby the sleeve 8 rotates at a speed exceeding the speed of the shaft 8a so that the clutch 8c is inoperative and allows the pull-down to draw the film toward the takeup reel, i.e., the supply reel 23 can rotate freely in a direction (arrow 25) to pay out the film.

The arrangement is preferably such that the operator terminates the application of finger pressure against the knob 13 when the threading of the leader of film is completed. The manual normally prescribes that the knob 13 can be released when the leader of the film reaches the takeup reel. The microswitch 30 then opens automatically because the spring 14 returns the bell crank lever 4 into engagement with the stop 17 so that the motor RM is arrested and the film is brought to a halt. The operator thereupon actuates a master switch (not shown) to start the projection of images of successive film frames onto a screen, not shown. If the microswitch 30 is omitted, i.e., if the motor RM is to be started in response to closing of the master switch, the termination of application of finger pressure against the knob 13 merely terminates the film threading operation. The motor RM continues to run even if the lever 4 reassumes the position of FIG. 1 and the projection of images begins without any interruption.

In order to rewind the film onto the supply reel 23, the motor RM is started in reverse while the bell crank lever 4 remains in the idle position of FIG. 1. The belt 6 is then driven in the direction of arrow 26 and rotates the pulley 5 which in turn drives the belt 7. The latter rotates the sleeve 8 in the direction of arrow 24 and the sleeve 8 drives the supply reel 23 in the same direction by way of the clutch 8c and shaft 8a.

The arm 3 is pivotable on the shaft 2 in order to allow for introduction of the supporting shaft 8a into the core of a supply reel 23 even if the dimensions of the reel 23 and or cartridge 123 deviate from optimum dimensions. The manner in which the cartridge 123 is separably secured to the housing 1 forms no part of the present invention.

The friction wheels 9, 10 can be replaced by gears which are brought into mesh when the knob 13 is depressed in the direction of arrow A.

The parts 7, 8, 8c constitute a power train which rotates the supporting shaft 8a and the reel 23 in a direction to collect the film independently of the friction coupling 10, 18 when the motor RM is operated in reverse and while the starting lever 4 of the film stripping mechanism assumes the idle position of FIG. 1.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is:

1. In a motion picture projector, a combination comprising a film stripping mechanism operable to thread the leader of film which is stored on a supply reel, said mechanism having starting means which is actuatable to initiate the operation of said mechanism; a rotary supporting member for the supply reel; and drive means for rotating said supporting member and the supply reel thereon in a direction to collect the film in response to actuation of said starting means, said drive means comprising friction coupling means arranged to transmit to said supporting member torque of a predetermined magnitude, said friction coupling means comprising coaxial rotary driving and driven elements, biasing means for urging one of said elements against the other element, and means for adjusting the bias of said biasing means to thereby change the magnitude of said torque.

2. A combination as defined in claim 1, wherein said supporting member is rotatable with the reel thereon in a direction to pay out the film in the non-actuated condition of said starting means, said friction coupling means being movable into driving engagement with said supporting member in response to actuation of said starting means.

3. A combination as defined in claim 2, wherein said friction coupling means is pivotable into driving engagement with said supporting member.

4. A combination as defined in claim 1, wherein said drive means further comprises means which are operable in non-actuated condition of said starting means to rotate said supporting member and the reel thereon in a direction to collect the film.

5. A combination as defined in claim 1, wherein said starting means comprises a manually operable actuating portion.

6. In a motion picture projector, a combination comprising a film stripping mechanism operable to thread the leader of film which is stored on a supply reel, said mechanism having starting means which is actuatable to initiate the operation of said mechanism and comprises a lever which is pivotable about a predetermined axis; a rotary supporting member for the supply reel; and drive means for rotating said supporting member and the supply reel thereon in a direction to collect the film in response to actuation of said starting means, said drive means comprising friction coupling means supported by said lever and arranged to transmit to said supporting member torque of a predetermined magnitude.

7. In a motion picture projector, a combination comprising a film stripping mechanism operable to thread the leader of film which is stored on a supply reel, said mechanism having starting means which is actuatable to initiate the operation of said mechanism, said starting means being pivotable about a predetermined axis; carrier means pivotable about said axis; a supporting member for the supply reel, said supporting member being rotatably mounted on said carrier means; and drive means for rotating said supporting member and the supply reel thereon in a direction to collect the film in response to actuation of said starting means, said drive means comprising friction coupling means arranged to transmit to said supporting member torque of a predetermined magnitude.

8. A combination as defined in claim 7, wherein said coupling means comprises a friction wheel which engages and rotates said supporting member in response to actuation of said starting means.

9. A combination as defined in claim 8, wherein said friction coupling means further comprises a driving element for said friction wheel and said drive means further comprises motor means for rotating said driving element in response to actuation of said starting means.

10. In a motion picture projector, a combination comprising a film stripping mechanism operable to thread the leader of film which is stored on a supply reel, said mechanism having a starting means which is actuatable to initiate the operation of said mechanism; a rotary supporting member for the supply reel; and drive means for rotating said supporting member and the supply reel thereon in a direction to collect the film in response to actuation of said starting means, said drive means comprising friction coupling means arranged to transmit to said supporting member torque of a predetermined magnitude, motor means operable in response to actuation of said starting means to drive said friction coupling means and a power train for rotating said supporting member independently of said friction coupling means in a direction to collect the film, said motor means being reversible to drive said supporting member by way of said power train and said power train including a rotary element coaxial with said supporting member and one-way clutch means interposed between said rotary element and said supporting member to drive the latter when the rotary element is driven by said motor means while the motor means is operated in reverse.

* * * * *